(12) United States Patent
Farah et al.

(10) Patent No.: US 9,770,776 B2
(45) Date of Patent: Sep. 26, 2017

(54) ALTERNATIVE POWER FOR ENGINE DRIVEN WELDER

(71) Applicant: LINCOLN GLOBAL, INC., City of Industry, CA (US)

(72) Inventors: Samir F. Farah, Broadview Heights, OH (US); Adam Hruska, Chardon, OH (US)

(73) Assignee: Lincoln Global, Inc., City of Industry, CA (US)

( * ) Notice: Subject to any disclaimer, the term of this patent is extended or adjusted under 35 U.S.C. 154(b) by 445 days.

(21) Appl. No.: 14/091,627

(22) Filed: Nov. 27, 2013

(65) Prior Publication Data

US 2015/0069037 A1 Mar. 12, 2015

Related U.S. Application Data

(60) Provisional application No. 61/876,793, filed on Sep. 12, 2013.

(51) Int. Cl.
*B23K 9/10* (2006.01)
(52) U.S. Cl.
CPC .......... *B23K 9/1006* (2013.01); *B23K 9/1081* (2013.01)
(58) Field of Classification Search
CPC ...... B23K 9/10; B23K 9/1006; B23K 9/1075; B23K 9/1062; B23K 9/1043; B23K 11/26
See application file for complete search history.

(56) References Cited

U.S. PATENT DOCUMENTS

| 6,653,596 | B2 | 11/2003 | Blankenship |
| 6,992,265 | B2 | 1/2006 | Bender et al. |
| 7,466,035 | B1 * | 12/2008 | Srybnik ............... F03B 17/063 290/43 |
| 8,080,761 | B2 | 12/2011 | Matthews et al. |
| 8,405,001 | B2 | 3/2013 | Albrecht |
| 2006/0037953 | A1 | 2/2006 | Matthews et al. |
| 2007/0215585 | A1 | 9/2007 | O'Connor |

(Continued)

FOREIGN PATENT DOCUMENTS

| WO | 0030241 | 5/2000 |
| WO | 2011091312 | 7/2011 |

OTHER PUBLICATIONS

PCT/IB2014/001807 International Search Report and Written Opinion of the International Searching Authority mailed Mar. 5, 2015.
(Continued)

*Primary Examiner* — Brian Jennison
(74) *Attorney, Agent, or Firm* — Tucker Ellis LLP; Carlos Garritano; Evan Perry

(57) ABSTRACT

The invention described herein generally pertains to a system and method for a welding device and, in particular, a hybrid welding device, that leverages a renewable energy source for a source of electrical current. The welding device can include one or more renewable energy kits that harvest renewable energy sources for performing a welding operation or a powering at least one of a device or component external to the welding device. The welding device includes renewable energy component that collects an input to convert to an electrical current that can be used as a replacement current, a supplemental current, or a complimentary current.

15 Claims, 11 Drawing Sheets

(56) References Cited

U.S. PATENT DOCUMENTS

| | | | |
|---|---|---|---|
| 2008/0272653 A1* | 11/2008 | Inoue | H02J 7/35 307/47 |
| 2011/0114607 A1* | 5/2011 | Albrecht | B23K 9/1006 219/108 |
| 2011/0114608 A1* | 5/2011 | Albrecht | B23K 9/1006 219/112 |
| 2011/0180522 A1* | 7/2011 | Bunker | B23K 9/1056 219/130.21 |
| 2011/0220628 A1 | 9/2011 | Mehn | |
| 2011/0309053 A1* | 12/2011 | Baus | B23K 9/1062 219/108 |
| 2012/0012559 A1 | 1/2012 | Fisher et al. | |
| 2012/0074116 A1 | 3/2012 | Matthews et al. | |
| 2013/0263911 A1* | 10/2013 | Bryson | B60L 8/003 136/244 |
| 2014/0001167 A1 | 1/2014 | Bunker et al. | |

OTHER PUBLICATIONS

PCT/IB2014/001807—Intl. Preliminary Report on Patentability & Written Opinion of the Intl. Searching Authority—mailed Mar. 24, 2016.

\* cited by examiner

ALTERNATIVE POWER FOR ENGINE DRIVEN WELDER

CROSS-REFERENCE TO RELATED APPLICATIONS

This application claims the benefit of priority to U.S. Provisional Application Ser. No. 61/876,793, filed Sep. 12, 2013, and entitled "ALTERNATIVE POWER FOR ENGINE DRIVEN WELDER." The entirety of the aforementioned application is incorporated herein by reference.

TECHNICAL FIELD

The invention described herein pertains generally to a system and method that leverages a renewable energy source for use with an engine driven welder.

BACKGROUND OF THE INVENTION

Frequently, welding is required where supply power may not be readily available. As such, the welding power supply may be an engine driven welding power supply incorporating a generator. The generator may supply power to the welder as well as to other power tools as may be needed on site. As different applications require different versions of welders and power tools, the trailer may be designed to carry one of many different types of welding power supplies.

Traditional welding-type apparatus can be broken into two basic categories. The first category receives operational power from transmission power receptacles, also known as static power. The second is portable or self-sufficient, stand alone welders having internal combustion engines, also known as rotating power. While in many settings conventional static power driven welders are preferred, engine driven welders enable welding-type processes where static power is not available. Rotating power driven welders operate by utilizing power generated from engine operation. As such, engine driven welders and welding-type apparatus allow portability and thus fill an important need.

Static powered welders initiate the weld process by way of a trigger on a hand-held torch or with an electrically charged stick connected to a charged electrode.

Rotating power driven welders operate similarly, as long as the engine is running. If the engine is shut down, there is typically no residual power to create an arc. To once again weld, the engine must be started and run at operational speed to produce the arc. Therefore, it is simply not possible to manually start and stop the engine between each and every break in the welding process. Further, even during longer periods, operators may find it easier to let the engine run because of distance to the engine, a misconception that it is better for the engine, or just out of habit.

SUMMARY OF THE INVENTION

In accordance with the present invention, there is provided a welding device that includes a motor-driven welder assembly including an engine that is configured to rotate a shaft and a rotor having at least one electromagnet, wherein the rotor is coupled to the shaft. The welding device can include a stator, having at least one electromagnet, that houses the rotor, wherein a rotation from the shaft rotates the rotor to generate a first portion of electrical current. The welding device further includes a renewable energy component that is configured to collect an input associated with a renewable energy and convert the input to a second portion of electrical current. The welding device includes a first energy storage device that is configured to store at least one of the first portion of electrical current or the second portion of electrical current and at least one of the first portion of electrical current or the second portion of electrical current is used as a power source for the welding device to perform a welding operation.

In accordance with the present invention, there is provided a method that includes at least the following steps: rotating a shaft; generating a first portion of electrical current based on rotating the shaft; storing the first portion of electrical current in an energy storage device; converting a renewable energy to a second portion of electrical current; and performing the welding operation with at least one of the first portion of electrical current or the second portion of electrical current.

In accordance with the present invention, there is provided a welding system that includes at least the following: a motor-driven welder assembly including an engine that is configured to rotate a shaft; a rotor having at least one electromagnet, the rotor is coupled to the shaft; a stator, having at least one electromagnet, that houses the rotor, wherein a rotation from the shaft rotates the rotor to generate a first portion of electrical current; a renewable energy component that is configured to collect an input associated with a renewable energy and convert the input to a second portion of electrical current; a first energy storage device that is configured to store at least one of the first portion of electrical current or the second portion of electrical current; at least one of the first portion of electrical current or the second portion of electrical current is used as a power source for the welding device to perform a welding operation; and a kit to collect the input, wherein the kit is solar kit to collect energy from sunlight, a hydro kit to collect energy from a flow of water, and a windmill kit to collect energy from a portion of wind.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Embodiments of the invention relate to methods and systems that generally relate to a welding device and, in particular, a hybrid welding device, that leverages a renewable energy source for a source of electrical current. The welding device can include one or more renewable energy kits that harvest renewable energy sources for performing a welding operation or a powering at least one of a device or component external to the welding device. The welding device includes renewable energy component that collects an input related to a renewable energy to convert to an electrical current that can be used as a replacement current, a supplemental current, or a complimentary current. By way of example and not limitation, the input can be a portion of sunlight, a portion of wind, a flow of a liquid, or a kinetic energy harnessing.

The subject innovation can be used with any suitable engine-driven welder, engine-driven welding system, engine-driven welding apparatus, a welding system powered by an engine, a welding system powered by a battery, a welding system powered by an energy storage device, a hybrid welder (e.g., a welding device that includes an engine driven power source and an energy storage device or batter), or a combination thereof. It is to be appreciated that any suitable system, device, or apparatus that can perform a welding operation can be used with the subject innovation and such can be chosen with sound engineering judgment without departing from the intended scope of coverage of the embodiments of the subject invention. The engine driven welder can include a power source that can be used in a variety of applications where outlet power is not available or when outlet power will not be relied on as the sole source of power including portable power generation, backup power generation, heating, plasma cutting, welding, and gouging. The example discussed herein relates to welding operations, such as, arc welding, plasma cutting, and gouging operations. It is to be appreciated that a power source can generate a portion of power, wherein the portion of power is electrical power. It is to be appreciated that "power source" as used herein can be a motor, an engine, a generator, an energy storage device, a battery, a component that creates electrical power, a rotor/stator assembly, a component that converts electrical power, or a combination thereof. By way of example and not limitation, FIGS. 1-4 illustrate welding systems or devices that can be utilized with the subject innovation. It is to be appreciated that the following welding systems are described for exemplary purposes only and are not limiting on the welding systems that can utilize the subject innovation or variations thereof.

Figure 1:
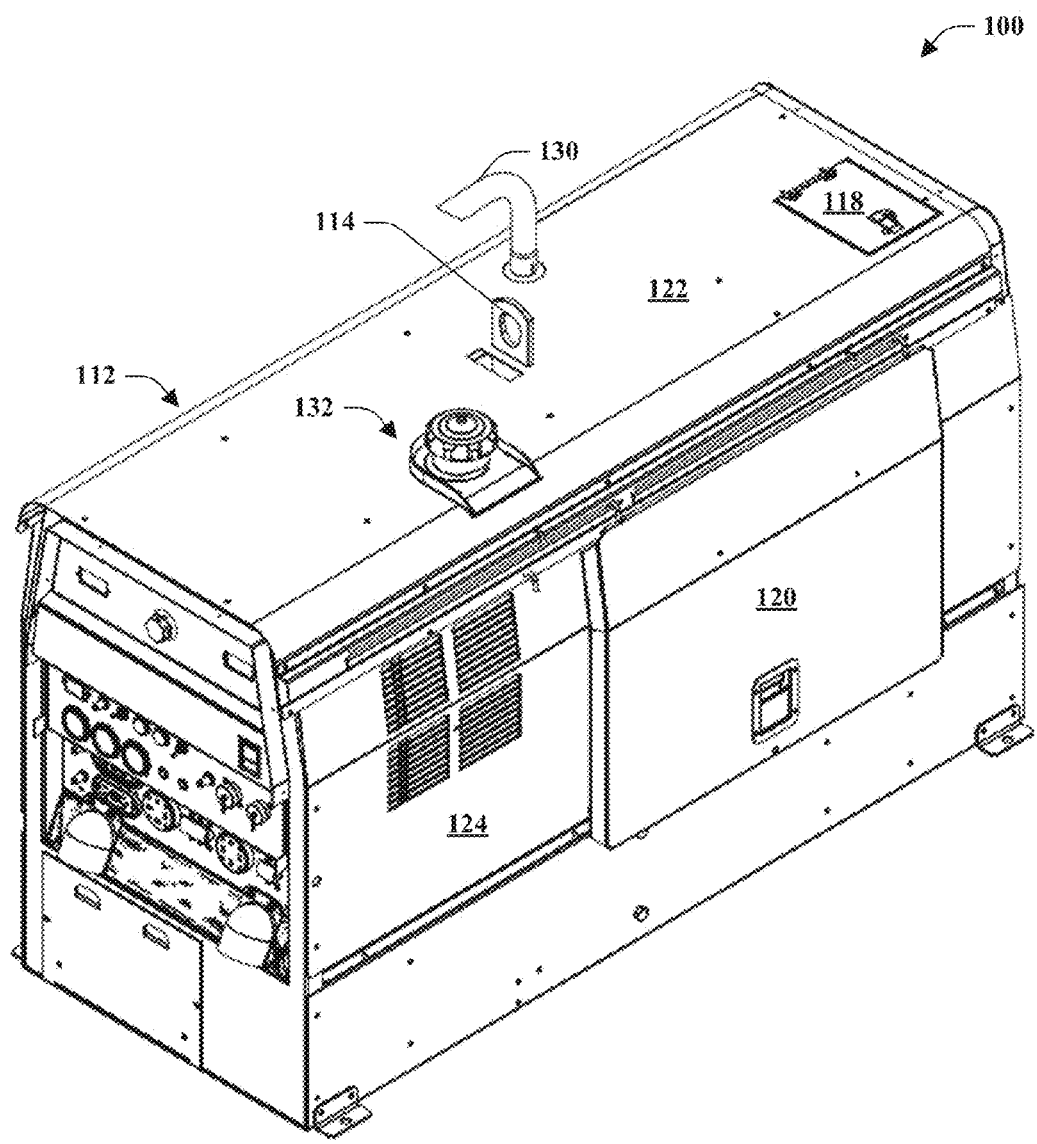
FIG. 1 is a block diagram illustrating a welding device that includes a motor as a power source.

FIG. 1 illustrates a welding device 100. The welding device 100 includes a housing 112 which encloses the internal components of the welding device. Optionally, the welding type device 100 includes a loading eyehook 114 and/or fork recesses 116. The loading eyehook 114 and the fork recesses 116 facilitate the portability of the welding device 100. Optionally, the welding-type device 100 could include a handle and/or wheels as a means of device mobility. The housing 112 also includes a plurality of access panels 118, 120. Access panel 118 provides access to a top panel 122 of housing 112 while access panel 120 provides access to a side panel 124 of housing 112. A similar access panel is available on an opposite side. These access panels 118, 120, provide access to the internal components of the welding device 100 including, for example, an energy storage device (not shown) suitable for providing welding-type power. An end panel 126 includes a louvered opening 128 to allow for air flow through the housing 112.

The housing 112 of the welding-type device 100 also houses an internal combustion engine. The engine is evidenced by an exhaust port 130 and a fuel port 132 that protrude through the housing 112. The exhaust port 130 extends above the top panel 122 of the housing 112 and directs exhaust emissions away from the welding-type device 100. The fuel port 132 preferably does not extend beyond the top panel 122 or side panel 124. Such a construction protects the fuel port 132 from damage during transportation and operation of the welding-type device 100.

Figure 2:
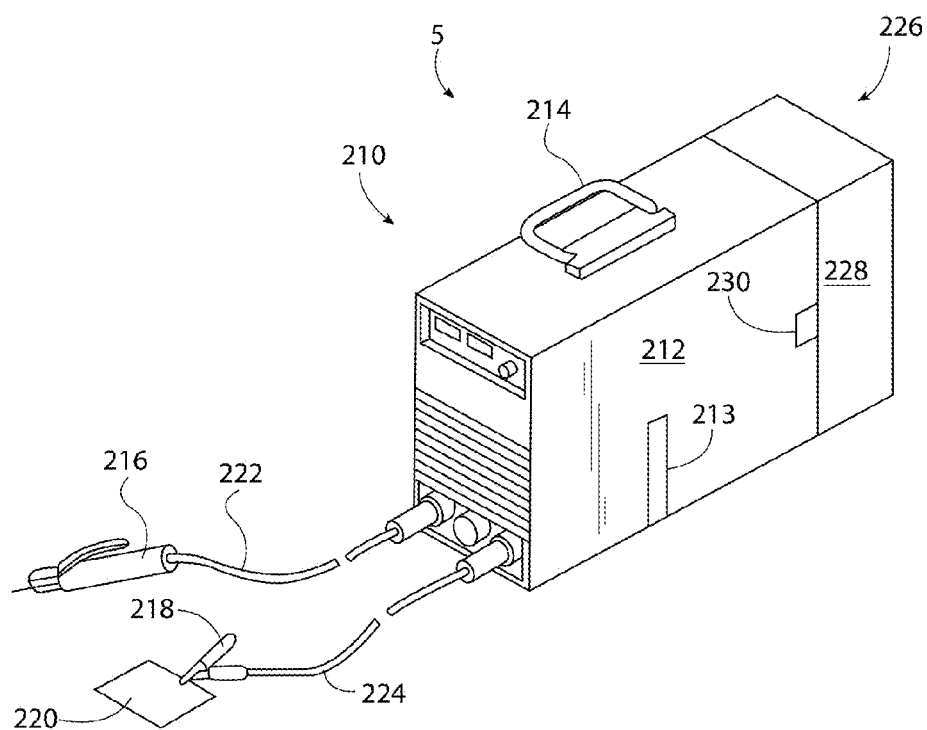
FIG. 2 is a block diagram illustrating a welding device.

Referring now to FIG. 2, a perspective view of a welding apparatus 205 that can be utilized with the subject innovation. Welding apparatus 205 includes a power source 210 that includes a housing 212 enclosing the internal components of power source 210. As will be described in greater detail below, housing 212 encloses control components 213. Optionally, welding device 210 includes a handle 214 for transporting the welding system from one location to another. To effectuate the welding process, welding device 210 includes a torch 216 as well as a grounding clamp 218. Grounding clamp 218 is configured to ground a workpiece 220 to be welded. As is known, when torch 216 is in relative proximity to workpiece 220, a welding arc or cutting arc, depending upon the particular welding-type device, is produced. Connecting torch 216 and grounding clamp 218 to housing 212 is a pair of cables 222 and 224, respectively.

The welding arc or cutting arc is generated by the power source by conditioning raw power received from an interchangeable energy storage device 226. In a preferred embodiment, energy storage device 226 is a battery. Energy storage device 226 is interchangeable with similarly configured batteries. Specifically, energy storage device 226 is encased in a housing 228. Housing 228 is securable to the housing of welding device 210 thereby forming welding-type apparatus 205. Specifically, energy storage device 226 is secured to power source 210 by way of a fastening means 230. It is contemplated that fastening means 230 may include a clip, locking tab, or other means to allow energy storage device 226 to be repeatedly secured and released from power source 210.

Figure 3:
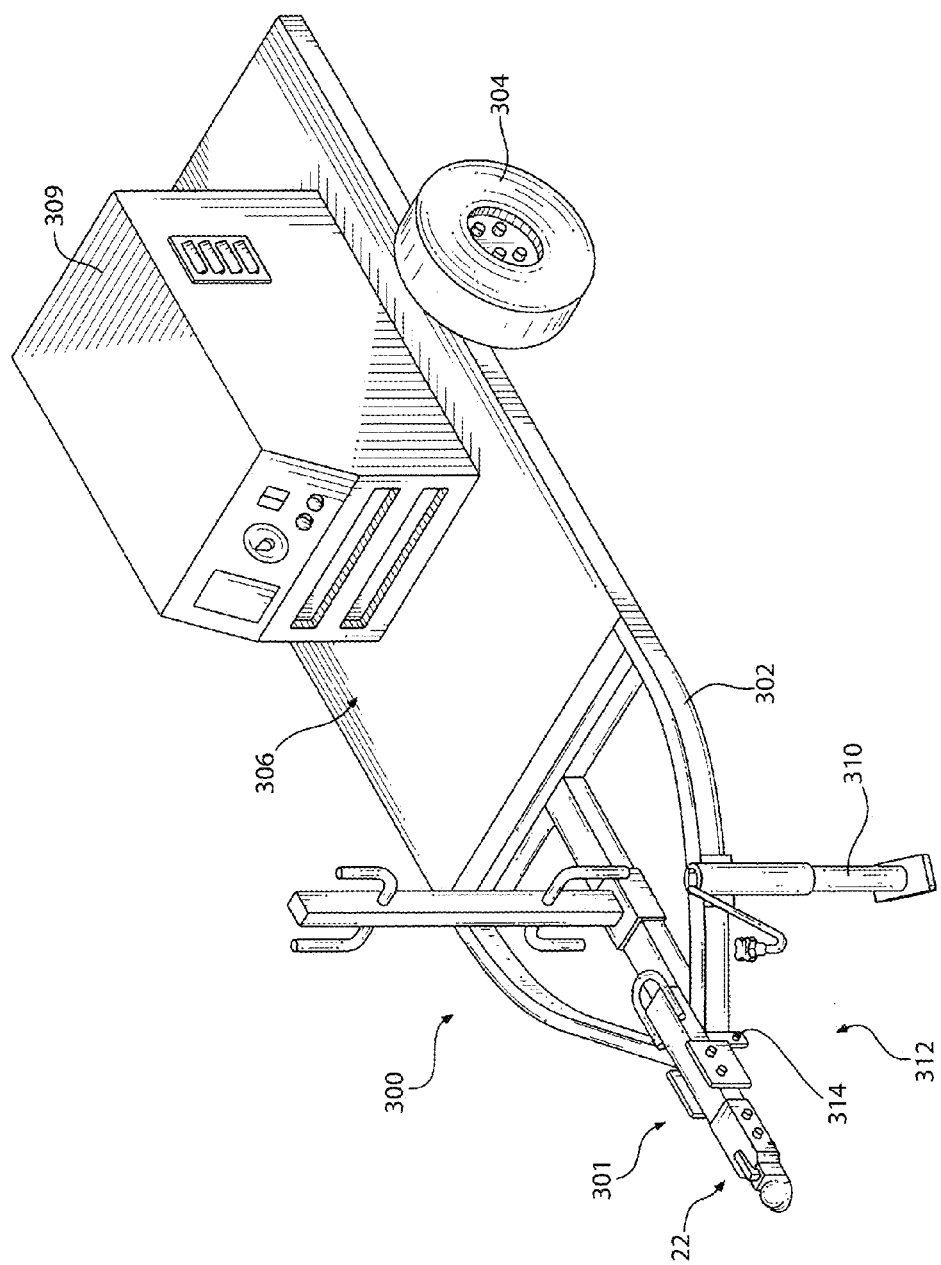
FIG. 3 is a block diagram illustrating a welding device affixed to a trailer for mobility.

FIG. 3 illustrates a trailer 300 incorporating a trailer hitch or hitching device, depicted generally at 301. The trailer 300 may include a trailer frame 302 and one or more trailer wheels 304 in rotational connection with the trailer frame 302 and may further include a payload region 306 for carrying one or more cargo items, which in an exemplary manner may be a welding power supply 309 or an engine driven welding power supply 309. The trailer 300 may also include an adjustable stand 310 for adjusting the height of the front end 312 of the trailer 300. However, any means may be used for raising and/or lowering the front end 312 of the trailer 300. The trailer hitch 301 may be a generally longitudinal and substantially rigid trailer hitch 301 and may be attached to the frame 302 via fasteners 314, which may be threaded bolts.

Figure 4A:
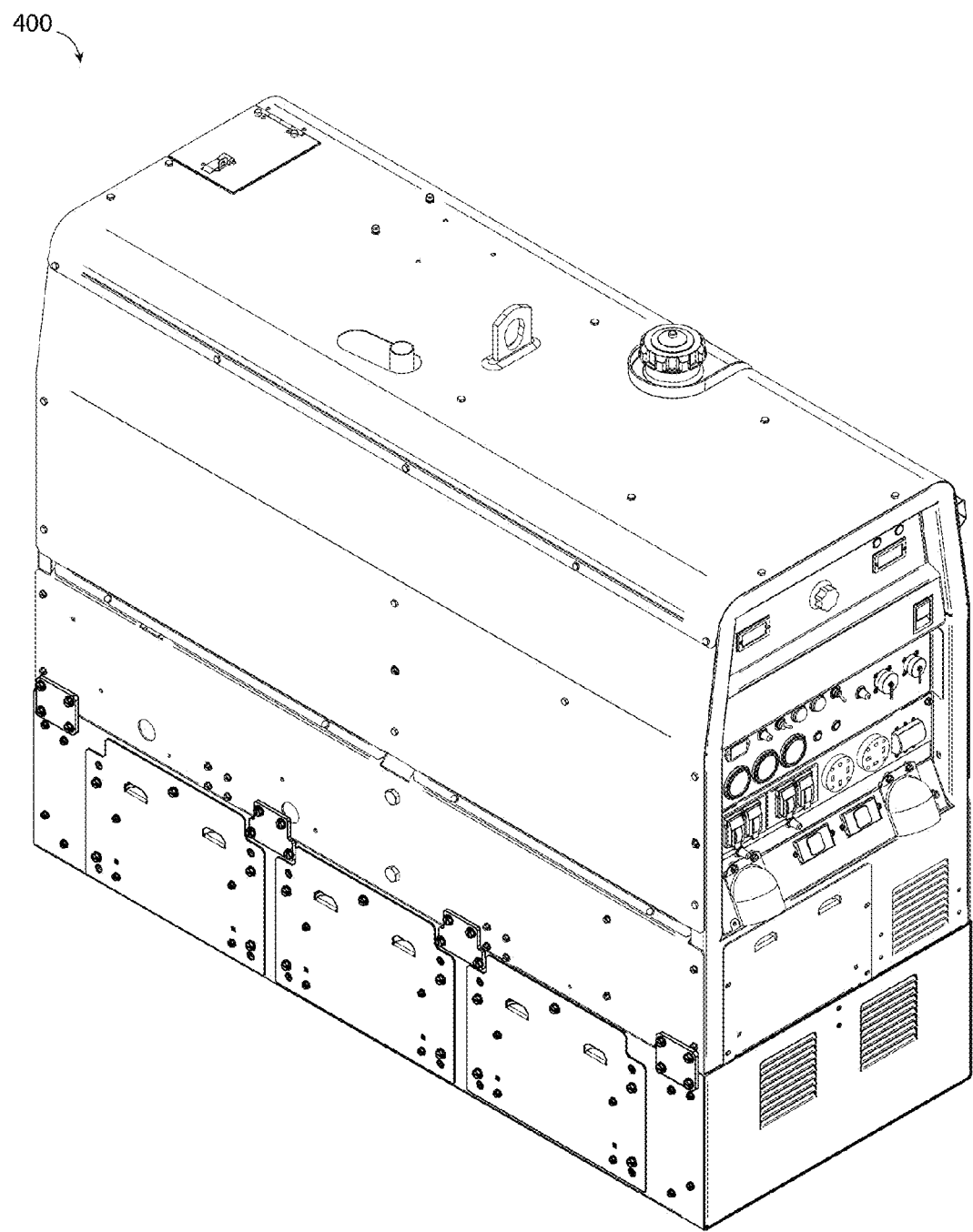
FIG. 4A is a block diagram illustrating a welding device.
Figure 4B:
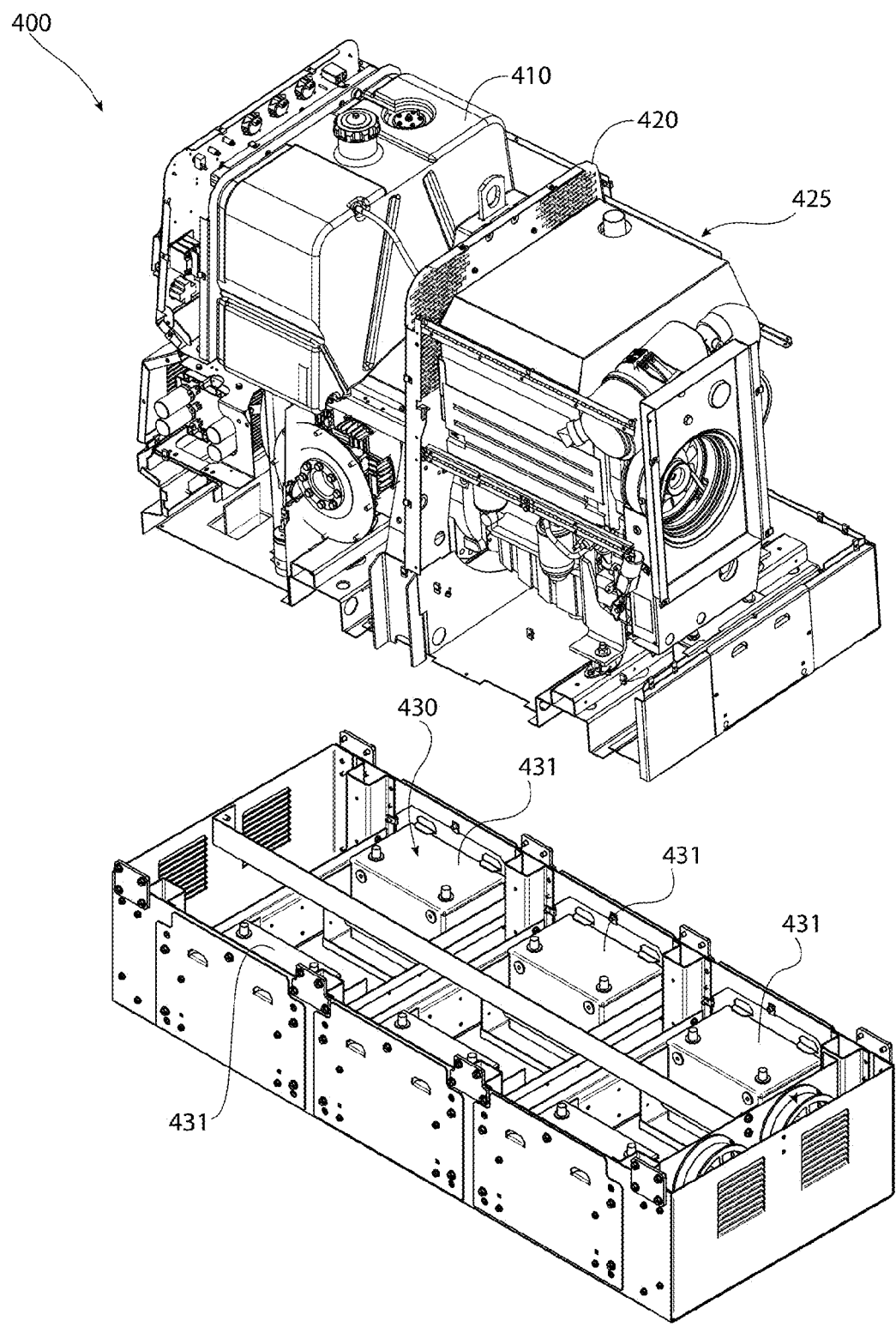
FIG. 4B is a block diagram illustrating a welding device.

FIGS. 4A and 4B illustrate a hybrid welding device (herein referred to as a "hybrid welder"). A hybrid welder according to the invention is generally indicated by the number 400 in the drawings. Hybrid welder 400 includes an engine component that runs on fuel from fuel storage 410 allowing the hybrid welder 400 to be portable. It will be appreciated that hybrid welder 400 may also be mounted in a permanent location depending on the application. Hybrid welder 400 generally includes a motor-driven welder assembly 420 having a motor 425 and an energy storage device 430. Motor 425 may be an internal combustion engine operating on any known fuel including but not limited to gasoline, diesel, ethanol, natural gas, hydrogen, and the like. These examples are not limiting as other motors or fuels may be used.

The motor 425 and energy storage device 430 may be operated individually or in tandem to provide electricity for the welding operation and any auxiliary operations performed by hybrid welder 400. For example, individual operation may include operating the motor 425 and supplementing the power from the motor 425 with power from the energy storage device 430 on an as needed basis. Or supplying power from the energy storage device 430 alone when the motor 425 is offline. Tandem operation may also include combining power from motor 425 and energy storage device 430 to obtain a desired power output. According to one aspect of the invention, a welder 400 may be provided with a motor having less power output than ordinarily needed, and energy storage device 430 used to supplement the power output to raise it to the desired power output level. In an embodiment, a motor with no more than 19 kW (25 hp) output may be selected and supplemented with six 12 volt batteries. Other combinations of motor output may be used and supplemented with more or less power from energy storage device. The above example, therefore, is not limiting.

Energy storage device 430 may be any alternative power source including a secondary generator, kinetic energy recovery system, or, as shown, one or more batteries 431. In an embodiment, six 12 volt batteries 431 are wired in series to provide power in connection with motor-driven welder assembly 420. Batteries 431 shown are lead acid batteries. Other types of batteries may be used including but not limited to NiCd, molten salt, NiZn, NiMH, Li-ion, gel, dry cell, absorbed glass mat, and the like.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIGS. 5-9 illustrate a schematic block diagram of a welding device, and in particular, an engine driven welding device as discussed in FIGS. 1-4. FIG. 10 is a method that can be utilized with an engine driven welding device as discussed in FIGS. 1-4.

Figure 5:
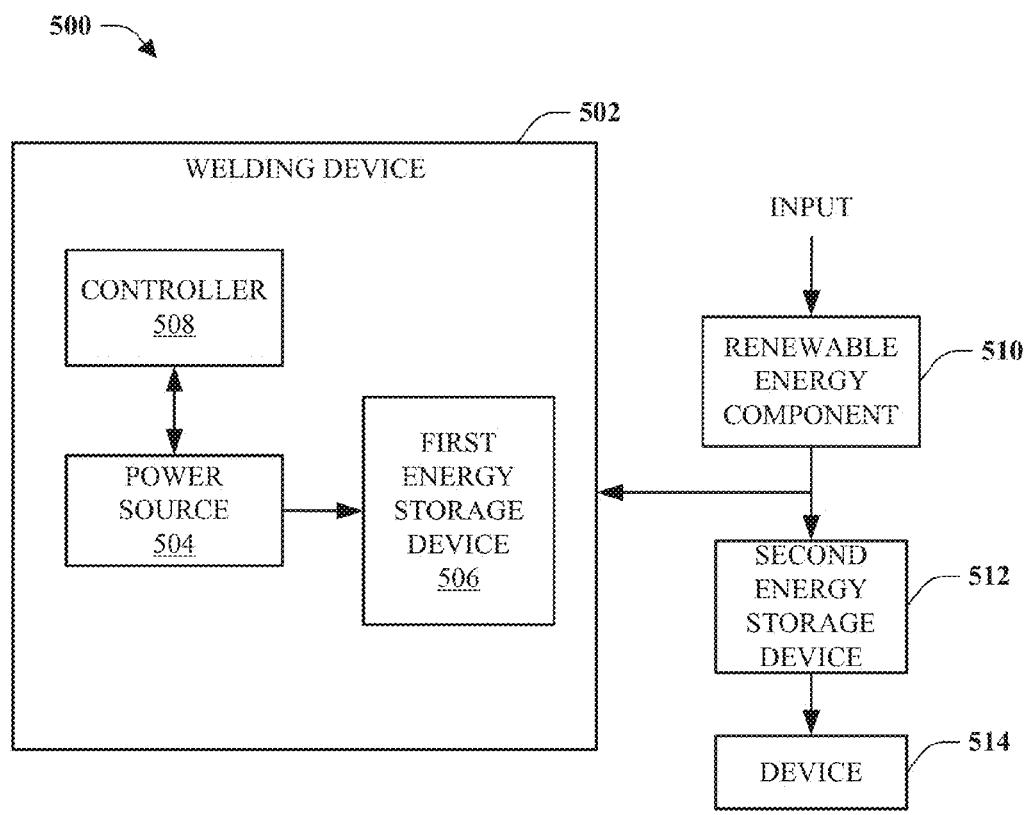
FIG. 5 is a block diagram illustrating a welding device that leverages renewable energy as a power source.

Turning to FIG. 5, welding system 500 is illustrated that includes welding device 502 with power source 504 that generates voltage and/or current for use with performing a welding operation. By way of example and not limitation, power source 504 can be a motor, an engine, an energy storage device, an outlet (e.g., AC/DC outlet source for voltage) configured to receive a power supply, a rotor/stator assembly, a combination thereof, among others. It is to be appreciated that power supply 504 can be chosen with sound engineering judgment without departing from the intended scope of coverage of the embodiments of the subject invention. For instance, a hybrid engine driven welding device can include one or more power sources 504 such as a combustion engine with a rotor/stator assembly (discussed in FIG. 6) that includes first energy storage device 506, wherein a first electrical current can be generated by such power sources 504. In an embodiment, a portion of the first electrical current can be used to perform a welding operation or stored in first energy storage device 506. Power source 504 as used in the subject innovation can generate and/or convert a plurality of voltages such simultaneously or at different times. For instance, a first voltage can be generated and a second voltage can be converted from the first voltage, wherein the conversion can be after the generation of the first voltage. In another embodiment, the second voltage can be converted at the same time as the generation of the first voltage. In still another embodiment, power source 504 can generate the first voltage and the second voltage at the same time such that no conversion is provided since the first voltage and the second voltage are generated directly. It is to be appreciated that these variations of voltage generation and conversion can be provided by power source 504 as well as other power sources described herein with the subject innovation.

Renewable energy component 510 is configured to collect an input related to renewable energy and convert the input into a second electrical current. By way of example and not limitation, the input can be a portion of wind, a flow of a liquid (flow of water, wave movement, etc.), a portion of sunlight, or a portion of kinetic energy harnessing. The second electrical current can be stored into second energy storage device, used to perform a welding operation with welding device 502, stored in first energy storage device 506, or a combination thereof. In a particular example, the second electrical current can be used to charge, power, or use at least one of device 514. Device 514 can be any suitable electronic device or component that consumes electricity. For instance, device 514 can be, but is not limited to being, a tablet, a smartphone, a cellular device, a network device, a router, a wireless router, a modem, a computer, a portable gaming device, a display, a server, a hard drive, a speaker, a keyboard, a touchscreen, a scanner, a printer, an Internet browsing device, a light, a compressor, a laptop, a processor, a charging device, a grinder, a tool, among others.

Welding device 502 further includes controller 508 that is configured to manage electrical current use. In particular, controller 508 can determine to perform a welding operation with power source 504, first energy storage device, renewable energy component 510, second energy storage device 512, or a combination thereof. Further, controller 508 can determine whether to utilize renewable energy component 510 to provide an electrical current to perform a welding operation or for an external (to welding device 502) use. Still further, controller 508 can manage whether to directly draw electrical current from power source 504, directly draw electrical current from renewable energy component 510, draw stored electrical current from first energy storage device 506, draw stored electrical current from second energy storage device 512, or a combination thereof.

It is to be appreciated that controller 508 can determine electrical current management (e.g., use of power source 504, use of renewable energy component 510, electrical current draw from first energy storage device 506, electrical current draw from second energy storage device, and the like) based on at least one of a welding parameter, a parameter related to an environment in which welding device 502 is used, a switch component (not shown), or a parameter related to welding device 502.

For instance, controller 508 can identify which power source (e.g., power source 504, renewable energy component 510, or a combination) based on a parameter. In an embodiment, the parameter can be a switch or a user input.

By way of example and not limitation, the parameter can be a switch that allows a first setting to select renewable energy component 510 to supply electrical current therefrom and a second setting to select power source 504 to supply electrical current therefrom. Additionally, the switch can include a third setting that selects both renewable energy component 510 and power source 504 to supply electrical current for consumption. In still another embodiment, an additional setting can be provided that allows selection of drawing electrical current from first energy storage device 506, second energy storage device 512, or a combination thereof.

In the embodiment, the parameter is at least one of a representative of power source 504 of welding device 502 operating, a representative of the welding operation being performed (e.g., welding, brazing, gouging, TIG, etc.), an amount of energy stored in first energy storage device 506 associated with welding device 502, a fuel amount contained within welding device 502, a cost of a fuel for the motor of welding device 502, a fuel consumption efficiency for welding device 502, a duration of time the motor of welding device 502 operates, a welding parameter (e.g., a voltage, a current, a portion of a waveform used for the welding operation, a location on a waveform during progression through a welding operation, a wire feed speed, a type of weld, a workpiece composition, etc.), and the like.

By way of example and not limitation, controller 508 can select renewable energy component 510, first energy storage device 506, or second energy storage device 512 to supply electrical current based on an amount of fuel stored in welding deice 502 for an included combustion engine, wherein the amount is below a particular threshold.

In still another example, the parameter can be related to a condition external to welding device 502 such as, but not limited to, a geographic location, a temperature, a barometer reading, a humidity level, a weather condition, an altitude, a wind speed, an amount of cloud cover, whether welding device 502 is stationary or in transport, an weather forecast, an amount of precipitation, and the like. For instance, controller 508 can select renewable energy component 510 as a source for electrical current based on a transportation of welding device 502, wherein the transportation can be used to collect inputs related to renewable energy such as sunlight, wind, kinetic energy harnessing, or a combination thereof.

Second energy storage device 512 can be a stand-alone component (as depicted), incorporated into welding device 502, or a combination thereof. Renewable energy component 510 can be a stand-alone component (as depicted), incorporated into welding device 502, coupled to welding device 502, affixed to welding device 502, portable and detachable from welding device 502, or a combination thereof. Controller 508 can be a stand-alone component (as depicted), incorporated into power source 504, incorporated into renewable energy component 510, or a combination thereof.

In an embodiment, renewable energy component 510 can be coupled to a portion of a trailer that is transporting welding device 502 to collect input for conversion to an electrical current. For instance, the portion of the trailer can be an axle, a wheel, or a part that is rotating during transport. Renewable energy component 510 collects kinetic energy and harnesses such energy for conversion for use welding device 502. For instance, renewable energy component 510 can be leverage rotational movement from a tire or an axle associated with a trailer that transports welding device 502.

Figure 6:
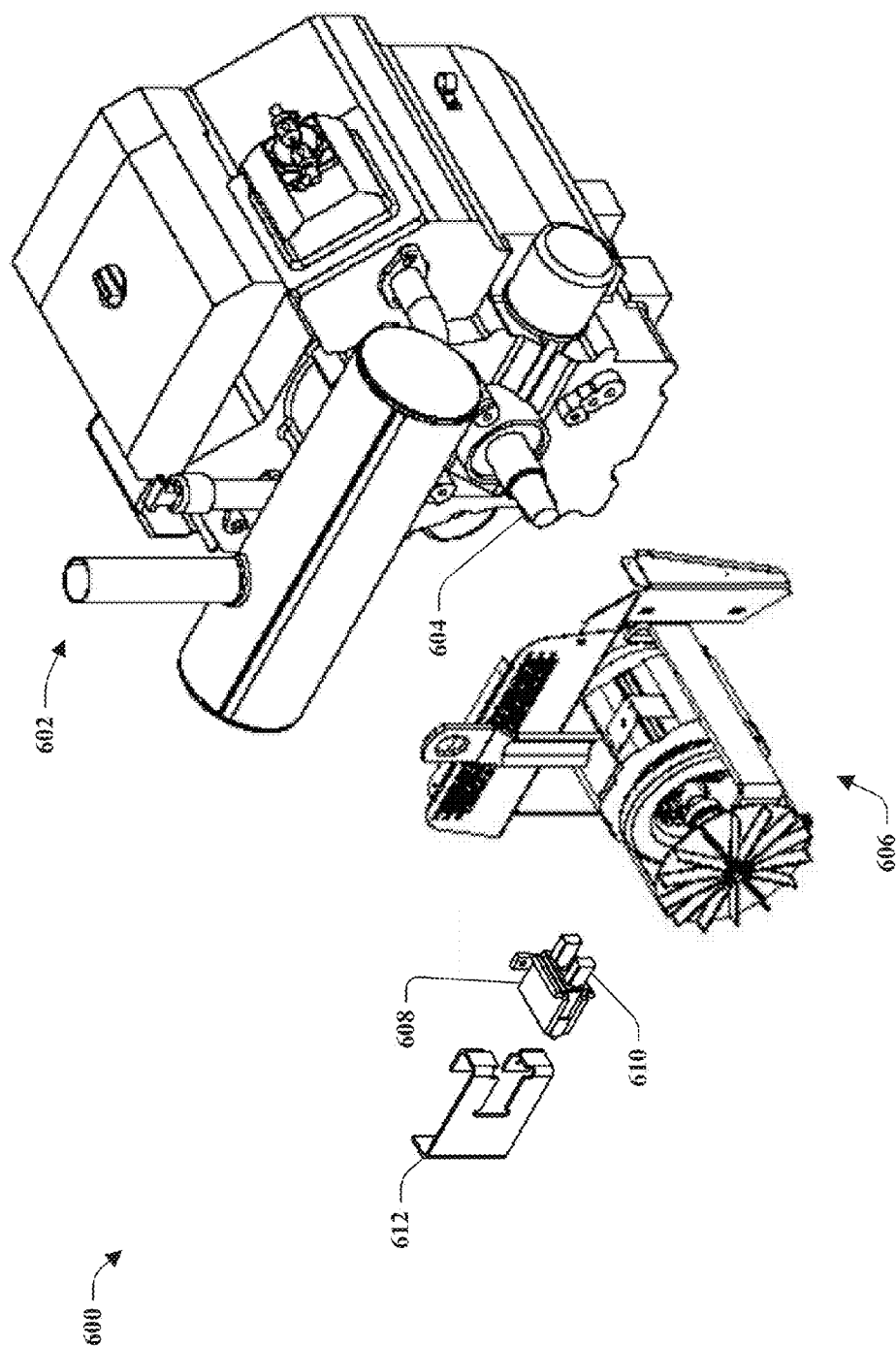
FIG. 6 is a diagram illustrating an engine driven welding system.

FIG. 6 illustrates engine driven welding system 600 that includes engine 602 that actuates shaft 604. In particular, engine 602 provides rotational movement to shaft 604 that is coupled to rotor/stator assembly 606. Rotor/stator assembly 606 includes a rotor that is coupled to shaft 604 for rotational movement and a stator that is stationary. It is to be appreciated that rotor/stator assembly 606 can be chosen with sound engineering judgment without departing from the scope of the subject innovation. For instance, the rotor and the stator of rotor/stator assembly 606 can include one or more electromagnets, wherein the rotor rotates from rotation from shaft 604 and stator is stationary and houses the rotor.

Rotor/stator assembly 606 can include at least one brush 610 that is housed in brush assembly 608 and affixed to a portion of rotor/stator assembly 606 via bracket 612. It is to be appreciated that brush assembly 608 can include at least one of a spring, a clip, a retainer, among others. Brush assembly 608 and bracket 612 can be chosen with sound engineering judgment without departing from the scope of the subject innovation. By way of example, brush assembly 608 is illustrated with a first brush and a second brush, however, it is to be appreciated that any suitable number of brushes can be used with the subject innovation. Brush 610 is in physical contact with at least a portion of rotor/stator assembly 606, wherein bracket 612 places brush 610 within proximity of rotor/stator assembly 606 and a spring (not shown) provides a force to brush 610 to physically contact rotor/stator assembly 606. In particular, brush 610 can physically contact a commutator (not shown) that is coupled to an axle (not shown) of the rotor included with rotor/stator assembly 606.

Figure 7:
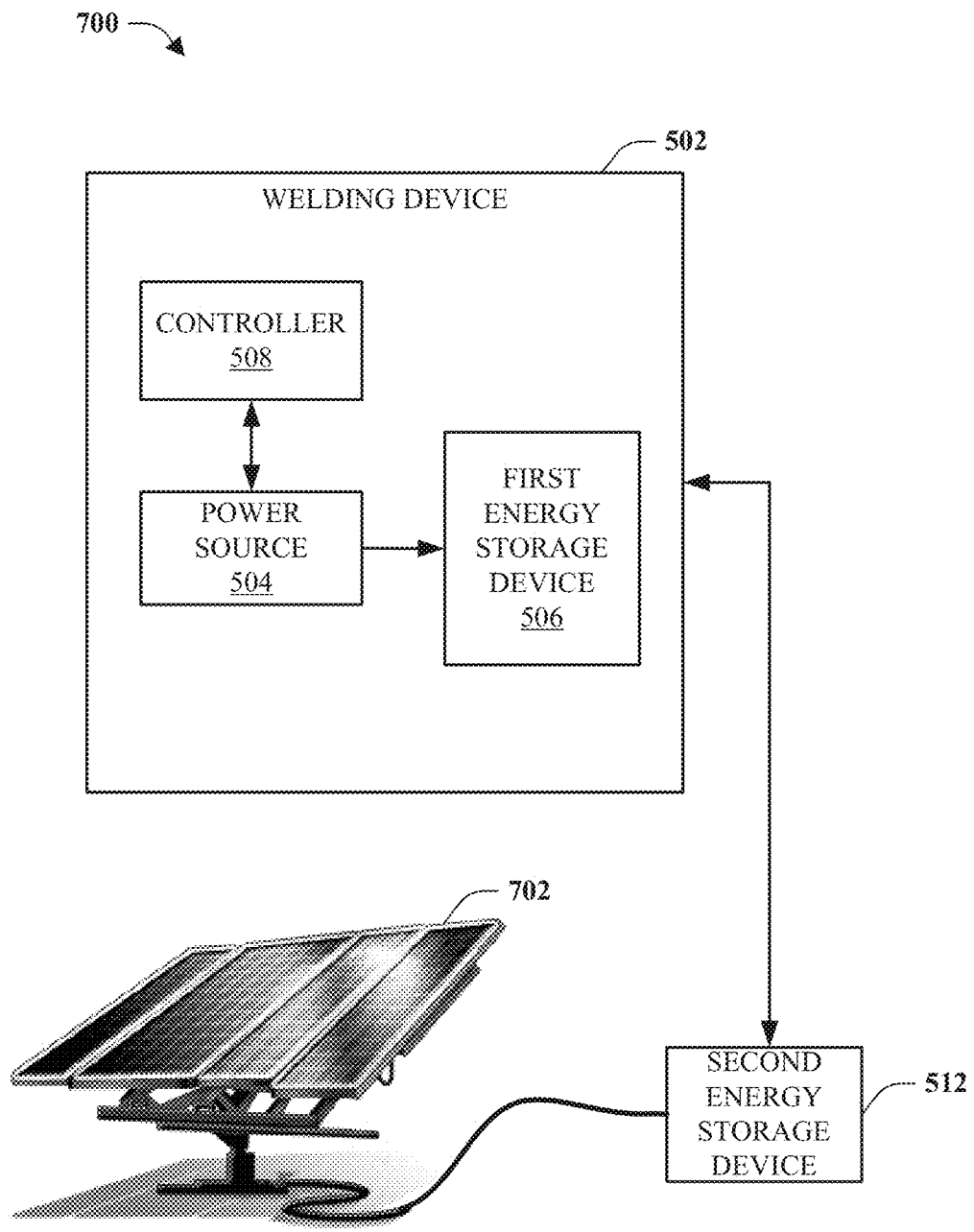
FIG. 7 is a block diagram illustrating a welding device that converts a portion of sunlight to an electrical current.

FIG. 7 illustrates a welding solar kit system 700 that includes welding device 502 as discussed above. Welding device 502 can include a solar kit as renewable energy component 702. By way of example and not limitation, renewable energy component 702 can be a solar panel that collects an input associated with a renewable energy source. Here, the renewable energy source can be solar energy or energy from sunlight. Renewable energy component 702 can collect a portion of sunlight and convert such portion of sunlight into an electrical current. The electrical current from renewable energy component 702 can be stored in at least one of second energy storage device 512, first energy storage device 506, or a combination thereof. In addition, the electrical current from renewable energy component 702 can be directly used with a welding operation, a device associated with welding device 502, an external device, or a combination thereof. It is to be further appreciated that controller 508 can manage the solar panel or a parameter related to conversion of the portion of sunlight.

It is to be appreciated that renewable energy component 702 can be a stand-alone component (as depicted), incorporated into welding device 502, coupled to welding device 502, affixed to welding device 502, portable and detachable from welding device 502, or a combination thereof. For instance, a solar panel (e.g., renewable energy component 702) can be part of a housing of welding device 502. Thus, during transport on trailer (See FIG. 3), renewable energy can be collected and converted into an electrical current. In another embodiment, a portable kit can be provided in which a user can determine whether to use the solar panel to collect energy. In another embodiment, welding device 502 can electrically connect to a renewable energy component 702 that is stationary and fixed to a particular location separate of welding device 502.

Figure 8:
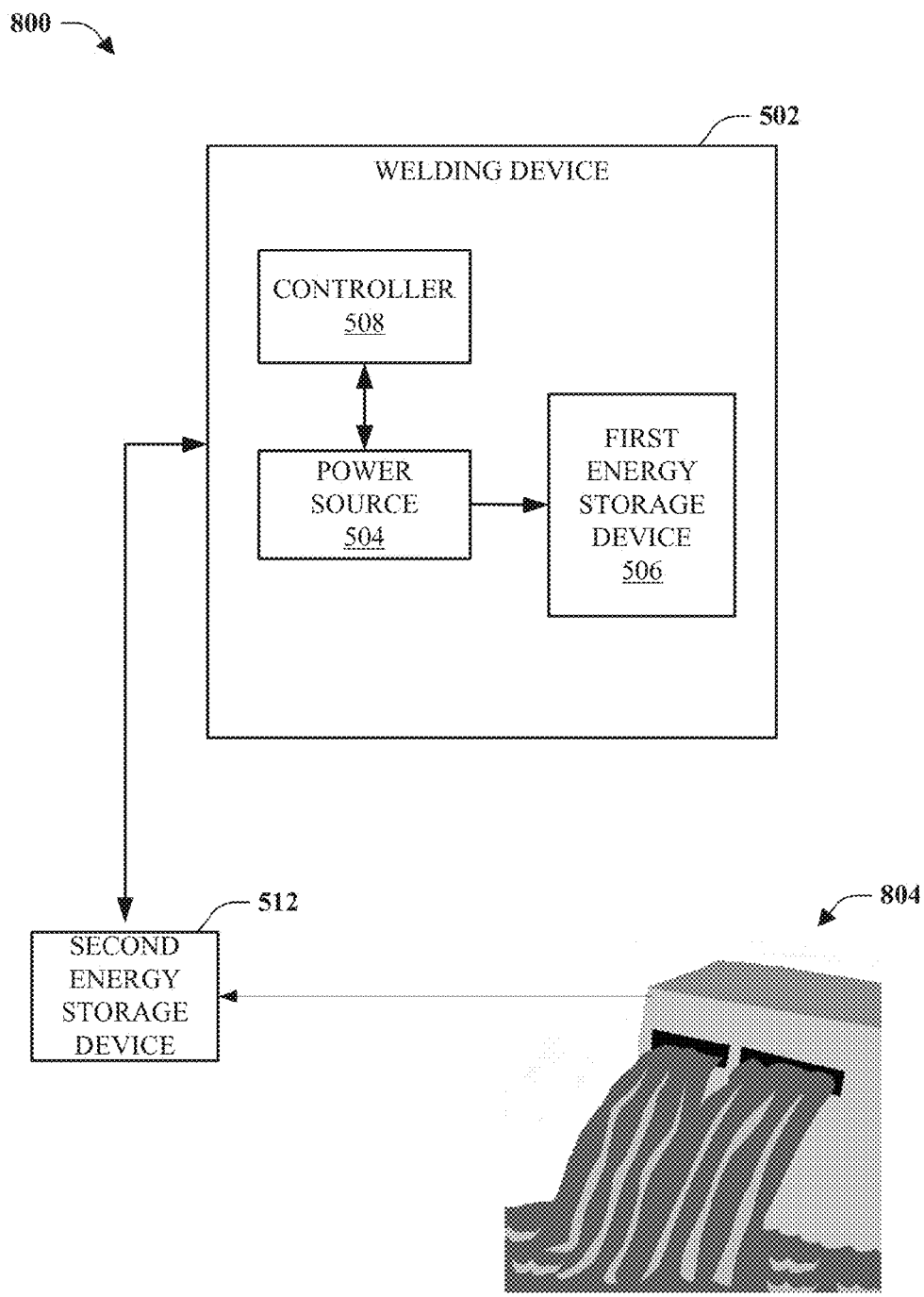
FIG. 8 is a block diagram illustrating a welding device that converts a flow of a liquid into an electrical current.

FIG. 8 illustrates a water kit system 800 that includes welding device 502 as discussed above. Welding device 502 can include a water kit as renewable energy component 804.

By way of example and not limitation, renewable energy component 804 can be hydroelectric system that includes a turbine that rotates due to a flow of water. Moreover, the renewable energy component 804 can be used to harvest energy from a wave in a body of water (e.g., lake, pond, ocean, sea, etc.). Renewable energy component 804 can collect a flow of water (via water passing and rotating a turbine) and convert such flow of water into an electrical current. The electrical current from renewable energy component 804 can be stored in at least one of second energy storage device 512, first energy storage device 506, or a combination thereof. In addition, the electrical current from renewable energy component 804 can be directly used with a welding operation, a device associated with welding device 502, an external device, or a combination thereof. It is to be further appreciated that controller 508 can manage the hydroelectric system or a parameter related to conversion of the flow of water.

It is to be appreciated that renewable energy component 804 can be a stand-alone component (as depicted), detachably coupled to welding device 502, affixed to welding device 502, portable and detachable from welding device 502, or a combination thereof. For instance, hydroelectric system (e.g., renewable energy component 804) can be detached from welding device 502 and placed into water (e.g., a river, a stream, a lake, a pond, a sea, an ocean, a waterfall, a man-made waterfall, and the like). In another embodiment, welding device 502 can electrically connect to a renewable energy component 804 that is stationary and fixed to a particular location separate of welding device 502.

Figure 9:
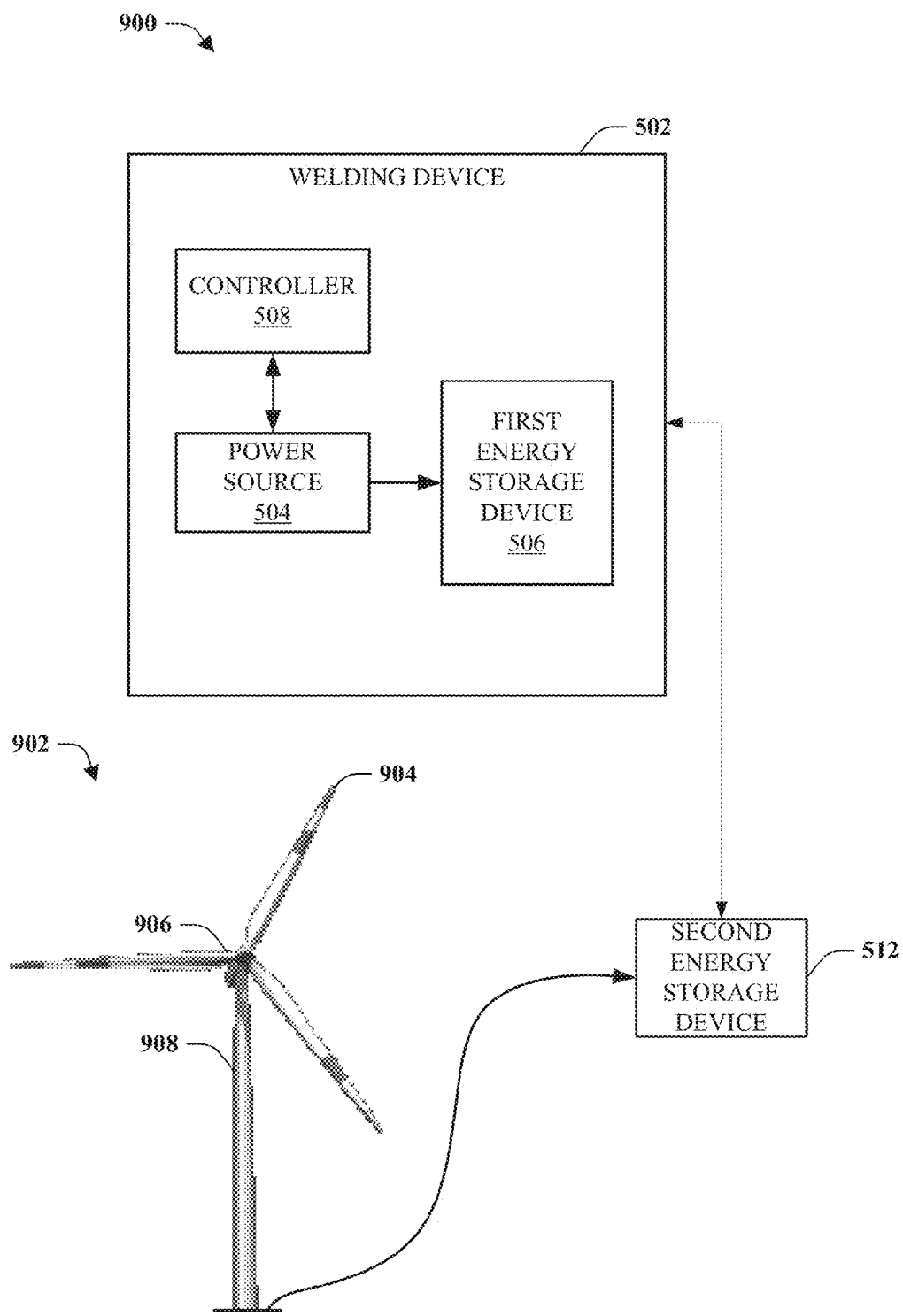
FIG. 9 is a block diagram illustrating a welding device that converts a portion of wind into an electrical current.
Figure 10:
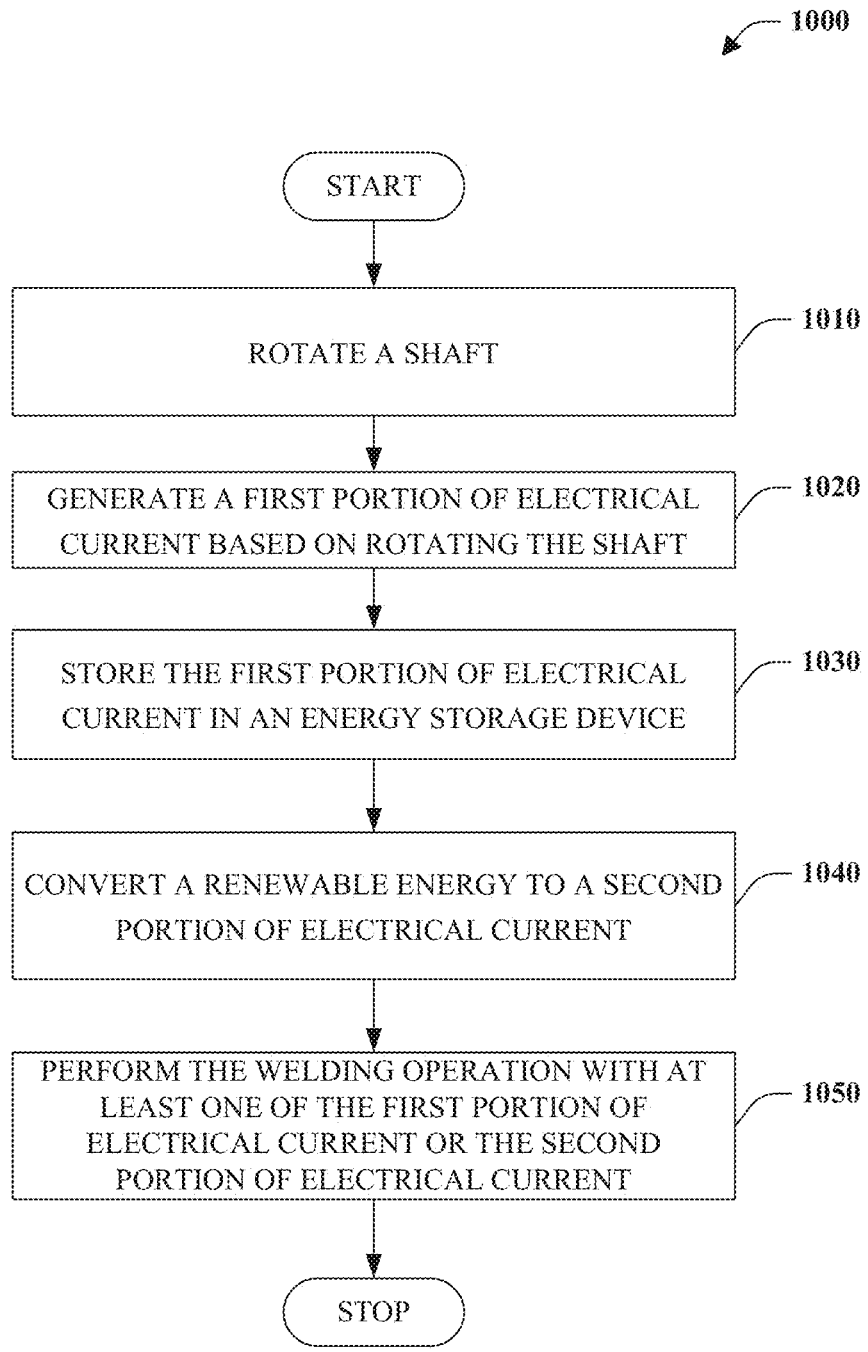
FIG. 10 is a flow diagram of converting a renewable energy to a portion of electrical current that can be used with a welding device.

FIG. 9 illustrates a wind kit system 900 that includes welding device 502 as discussed above. Welding device 502 can include a wind kit as renewable energy component 902. By way of example and not limitation, renewable energy component 902 can be windmill system that includes at least one blade 904, a turbine 906, and a base or support 908. Windmill system (e.g., renewable energy component 902) includes one or more blades 904 that are rotated based on capturing wind and convert such wind flow into an electrical current. The electrical current from renewable energy component 902 can be stored in at least one of second energy storage device 512, first energy storage device 506, or a combination thereof. In addition, the electrical current from renewable energy component 902 can be directly used with a welding operation, a device associated with welding device 502, an external device, or a combination thereof. It is to be further appreciated that controller 508 can manage the windmill system or a parameter related to turbine 906, blade 904, or a combination thereof. For example, an angle or blade 904 can be adjusted by controller 906.

It is to be appreciated that renewable energy component 902 can be a stand-alone component (as depicted), detachably coupled to welding device 502, affixed to welding device 502, portable and detachable from welding device 502, or a combination thereof. For instance, windmill system (e.g., renewable energy component 902) can be detached from welding device 502 and secured to collect wind energy. In another embodiment, welding device 502 can electrically connect to a renewable energy component 902 that is stationary and fixed to a particular location separate of welding device 502. In still another example, windmill system 902 can be integrated into a casing or housing of welding device 502. For instance, during a transportation of welding device 502 with a trailer (See FIG. 3), windmill system (e.g., renewable energy component 902) can convert wind into an electrical current.

In an embodiment, the welding device includes a second energy storage device that is configured to store the first portion of electrical current and a controller component that selects between the first portion of the electrical current that is stored with the energy storage device to perform the welding operation or the first portion of the electrical current that is generated by the rotation of the rotor to perform the welding operation, or the second portion of electrical current to perform the welding operation. In an embodiment, the welding device includes a switch component that selects to collect and convert the renewable energy from the input.

In the embodiment, the input is a portion of sunlight. In the embodiment, the welding device includes a solar panel that collects the portion of sunlight. In an embodiment, the solar panel is integrated into a housing of the welding device.

In an embodiment, the input is a portion of wind. In an embodiment, the welding device includes a windmill that includes: at least one blade that captures the portion of wind, and a turbine that controls a direction and an angle of the at least one blade, wherein the turbine converts movement from the at least one blade that captures the portion of wind to the second portion of electrical current. In the embodiment, the windmill is affixed to the welding device. In the embodiment, the welding device includes a trailer having a trailer frame, one or more trailer wheels in rotational connection with the trailer frame, and a payload region for carrying the welding device. In the embodiment, the windmill that is configured to capture the wind during a transport of the welding device.

In an embodiment, the input is a flow of a liquid. In the embodiment, the liquid is water and the flow is a current. In an embodiment, the welding device includes a turbine that is rotated by the flow of the liquid and converts an energy from rotation to the second portion of electrical current. In the embodiment, the turbine is portable and detachable in comparison to the welding device.

In view of the exemplary devices and elements described supra, methodologies that may be implemented in accordance with the disclosed subject matter will be better appreciated with reference to the flow charts and/or methodologies of FIG. 10. The methodologies and/or flow diagrams are shown and described as a series of blocks, the claimed subject matter is not limited by the order of the blocks, as some blocks may occur in different orders and/or concurrently with other blocks from what is depicted and described herein. Moreover, not all illustrated blocks may be required to implement the methods and/or flow diagrams described hereinafter.

Sequentially, the following occurs as illustrated in the decision tree flow diagram 1000 of FIG. 10 which is flow diagram 1000 that converts a renewable energy source into electrical current that is used with a welding device. A shaft is rotated (reference numeral 1010). A first portion of electrical current is generated based on rotating the shaft (reference numeral 1020). The first portion of electrical current is stored in an energy storage device (reference numeral 1030). A renewable energy is converted to a second portion of electrical current (reference numeral 1040). The welding operation is performed with at least one of the first portion of electrical current or the second portion of electrical current (reference numeral 1050).

In an embodiment, the method further includes storing the second portion of electrical current in at least one of the energy storage device or a second energy storage device. In an embodiment, the method further includes powering a device with the second portion of electrical current. In the embodiment, the device is at least one of a light, a compressor, a smartphone, a laptop, a processor, a computer, a display, a tablet, a charging device, a grinder, a tool, or an Internet browsing device. In the embodiment, the renewable energy is captured from at least one of a solar panel, a windmill, or a hydropower component.

While the embodiments discussed herein have been related to the systems and methods discussed above, these embodiments are intended to be exemplary and are not intended to limit the applicability of these embodiments to only those discussions set forth herein. The control systems and methodologies discussed herein are equally applicable to, and can be utilized in, systems and methods related to arc welding, laser welding, brazing, soldering, plasma cutting, waterjet cutting, laser cutting, and any other systems or methods using similar control methodology, without departing from the spirit or scope of the above discussed inventions. The embodiments and discussions herein can be readily incorporated into any of these systems and methodologies by those of skill in the art. By way of example and not limitation, a power supply as used herein (e.g., welding power supply, among others) can be a power supply for a device that performs welding, arc welding, laser welding, brazing, soldering, plasma cutting, waterjet cutting, laser cutting, among others. Thus, one of sound engineering and judgment can choose power supplies other than a welding power supply departing from the intended scope of coverage of the embodiments of the subject invention.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A system, comprising:
a welding device operable to perform a welding operation, the welding device includes:
an engine-driven generator having a stator with at least a first electromagnet, the stator houses a rotor having at least a second electromagnet, the rotor is coupled to a shaft rotatable through operation of the engine to generate a first electric current; and
an energy storage device configured to store electrical energy;
a portable renewable energy device detachably coupled to the welding device that generates a second electric current from a renewable energy source; and
a controller configured to select at least one of the energy storage device, the engine-driven generator, or the renewable energy device as a power source for the welding operation based on at least one of a fuel amount contained within the welding device, a cost of fuel for the welding device, a fuel consumption efficiency for the welding device, or a duration of time the engine-driven generator operates.

2. The system of claim 1, wherein the welding device further comprises a user-operable switch to select the renewable energy device as the power source for the welding operation.

3. The system of claim 1, wherein the renewable energy device is a solar panel that converts sunlight to electrical energy.

4. The system of claim 3, wherein the solar panel is coupled to a housing of the welding device.

5. The system of claim 1, wherein the renewable energy device is a wind turbine configured to convert kinetic energy of wind to electrical energy.

6. The system of claim 5, wherein the wind turbine is coupled to a housing of the welding device.

7. The welding device of claim 1, wherein the renewable energy device is a hydropower component configured to convert kinetic energy of water to electrical energy.

8. A welding system, comprising:
a welding device operable to perform a welding operation, the welding device includes:
a motor-driven generator including an engine configured to rotate a shaft, a rotor coupled to the shaft and having at least one electromagnet, and a stator, having at least one electromagnet, that houses the rotor such that rotation of the shaft rotates the rotor with respect to the stator to generate a first electric current;
an energy storage device configured to store electrical energy; and
a renewable energy kit configured to generate a second electric current from a renewable energy source, the renewable energy kit is portable and detachably coupled to the welding device and configured to deliver the second electric current to the welding device; and a controller configured to select at least one of the energy storage device, the motor-driven generator, or the renewable energy kit as a power source for the welding operation based on at least one of a welding voltage, a welding current, a waveform used for the welding operation, a wire feed speed, a type of weld, or a workpiece composition.

9. A welding device, comprising:

a welding torch;

a power source configured to provide a welding output to the welding torch to produce an arc between the welding torch and a workpiece;

an engine-driven generator configured to generate a first electric current;

an energy storage device configured to store electrical energy and to discharge stored energy to generate a second electric current;

a connector for detachably coupling to a renewable energy device to receive a third electric current, the renewable energy device is portable and detachable from the welding device and is configured to convert energy from a renewable energy source into electrical energy; and a controller configured to select at least one of the energy storage device, the engine-driven generator, or the connector to provide electrical current to the power source, as a basis for the welding output provided to the welding torch, based on at least one of a geographic location of the welding device, a temperature at a location of the welding device, a barometer reading at the location of the welding device, a humidity level at the location of the welding device, an altitude at the location of the welding device, a wind speed at the location of the welding device, an amount of cloud cover at the location of the welding device, an amount of precipitation at the location of the welding device, or a weather forecast for the location of the welding device.

10. The welding device of claim 9, further comprising a user-operable switch to select the renewable energy device as input to the power source for a welding operation.

11. The welding device of claim 9, wherein at least one of the first electric current from the engine-driven generator or the third electric current received from the renewable energy device is utilized to charge the energy storage device.

12. The welding device of claim 9, wherein the renewable energy device is configured to obtain solar energy to generate the third electric current.

13. The welding device of claim 12, wherein a solar panel is attached to a housing of the welding device.

14. The welding device of claim 9, wherein the renewable energy device is a hydropower component configured to convert kinetic energy of water to electrical energy.

15. The welding device of claim 9, wherein the renewable energy device is a wind turbine configured to convert kinetic energy of wind to electrical energy.

* * * * *